United States Patent [19]
Kalitinsky et al.

[11] 3,735,139
[45] May 22, 1973

[54] PHOTO DETECTOR SYSTEM WITH DUAL MODE CAPABILITY

[75] Inventors: Andrew Kalitinsky, La Jolla; James W. Crooks, Jr., San Diego, both of Calif.

[73] Assignee: General Dynamics Corporation, San Diego, Calif.

[22] Filed: Apr. 7, 1972

[21] Appl. No.: 241,932

[52] U.S. Cl......250/213 VT, 250/220 M, 313/65 AB
[51] Int. Cl..........................H01j 31/26, H01j 31/50
[58] Field of Search ...............................313/65 AB; 250/220 M, 213 VT

[56] References Cited
UNITED STATES PATENTS

| | | | |
|---|---|---|---|
| 2,213,548 | 9/1940 | Iams | 250/220 M |
| 2,903,596 | 9/1959 | Reed | 250/213 VT |
| 3,322,955 | 5/1967 | Desvignes | 250/213 VT |

*Primary Examiner*—Archie R. Borchelt
*Assistant Examiner*—T. N. Grigsby
*Attorney*—Martin LuKacher

[57] ABSTRACT

A photo detector system is described which has dual modes of operation under both dim and bright illumination conditions. Optics image incoming illumination directly upon an array of semiconductor detector diodes as well as upon a photo cathode. When bright light is present the optical image is focused upon the diode detector array and no high voltage is applied to the photo cathode. The light will not damage the photo cathode since the high voltage is off. Also, no electrons are accelerated toward the photo diode detectors. Thus, during bright light operation, the signal current is caused primarily by the direct effect of light on the diode detectors.

In dim light, high negative voltage is applied to the photo cathode and the optical image is focused on the photo cathode. The electron optic design causes the electrons emitted from the photo cathode to be imaged onto the same diode detectors that are used during bright light operation. These electrons strike the detectors with a high velocity induced by the applied voltage. The signal current due to this electron bombardment is therefore many times greater than the current due to the dim light striking the diodes directly. Detector response to dim levels of illumination is thus increased while retaining normal operational capability under bright illumination conditions.

34 Claims, 7 Drawing Figures

PATENTED MAY 22 1973

PHOTO DETECTOR SYSTEM WITH DUAL MODE CAPABILITY

The present invention relates to the radiant energy detection systems and particularly to detection systems with the capability of augmenting or intensifying radiant energy signals under low intensity (e.g., dim light) conditions.

The invention is especially suitable for use in image detectors which provide electrical signals in response to images. The detector provided by the invention also has applications in aids for blind persons, devices for detecting objects in the dark (viz., infra-red scopes) and in camera systems for television purposes as well as in any other applications where detection of radiant energy at different levels of intensity is required.

Oftentimes it is necessary to sense and detect images in both bright and dim illumination. By illumination is meant visible illumination (i.e., light), invisible illumination such as infra-red, ultra-violet and other frequencies in or near the optical wavelengths, and other radiant energy illumination. Typically, intensification of the image is accomplished electronically after the image is translated into the form of electronic signals. More often, completely different detectors must be provided and used under dim illumination conditions. The increase in the sensitivity of dim illumination responsive detectors is limited by the characteristics of photo-sensitive materials used therein. Detectors which operate by increasing the amplitude of the transduced electronic signals are subject to the influence of noise as well as the complexity brought about by the addition of the requisite electronic equipment.

It is a feature of this invention to provide a photo detector system with the capability of augmenting the response to images received under dim light conditions in the photo detector itself. Normal operation capability of the photo detector is retained and the apparatus may be used with light or dim illumination with a minimum of readjustment.

Accordingly, it is an object of the present invention to provide an improved photo detector system.

It is a further object of the invention to provide photo detector apparatus capable of operation with high level and low level illumination using the same photo detector components.

It is a still further object of the present invention to provide improved apparatus capable of intensifying images electronically.

It is a still further object of the present invention to provide improved image intensification apparatus wherein intensification is accomplished within the photo detector device itself.

Briefly described, apparatus embodying the invention which is capable of intensifying images, includes as its components, a photo electric element. Radiant energy from the image may be imaged directly on this photo electric element. A photo emissive element is also provided. The radiant energy from the image may also be imaged upon this photo emissive element. Electron optics are provided for imaging the electrons emitted by the photo emissive element upon the photo electric element. The image produced by the electrons impinging upon the photo electric element is thereby intensified. It is believed that such intensification results from the phenomenon known as electron bombardment conduction whereby high velocity electrons cause a much larger current to flow in the photo electric element than is caused by illumination directly received by the element. Under bright illumination conditions the images are focused at the photo electric element, while under dim illumination conditions the images are focused on the photo emissive element and the electron optics are used to accelerate the electrons; thus producing an electron image which is translated by the photo electric element into the relatively high level signals corresponding to signals which are produced under bright illumination conditions.

The invention itself, both as to its organization and method of operation, as well as additional objects and advantages thereof, will become more readily apparent from a reading of the following description in connection with the accompanying drawing, in which.

Figure 1:
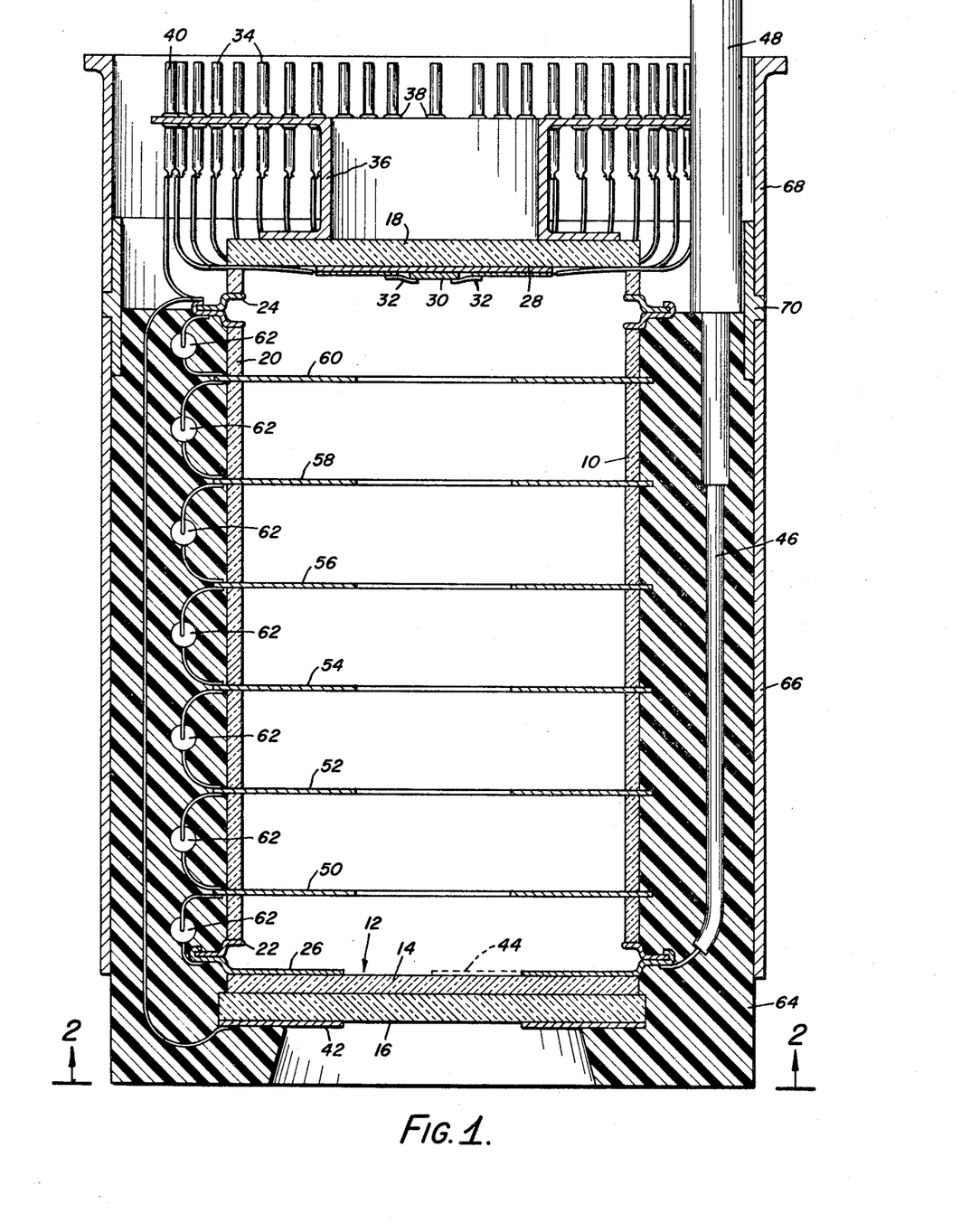
FIG. 1 is a cross-sectional view of a photo detector tube embodying the invention.
Figure 2:
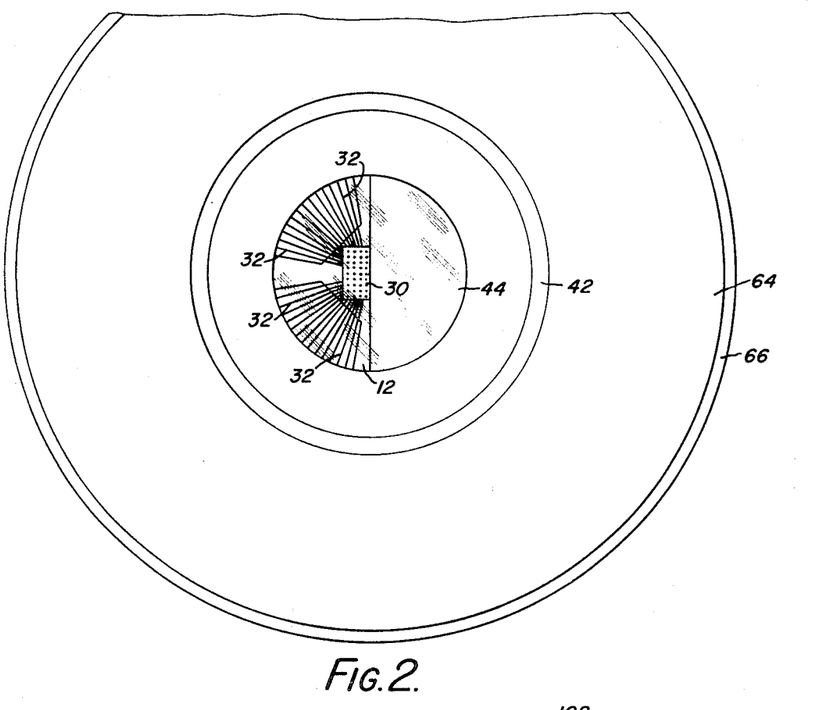
FIG. 2 is an end-view of the tube shown in FIG. 1.

Referring particularly to FIGS. 1 and 2, there is shown a photodetector tube having an envelope 10 which may be made of glass. A window 12 made up of two glass plates, 14 and 16, are located at the lower end of the envelope as viewed in the drawing; the tube being capable of orientation in any direction or operational position. Another plate 18 is located at the upper end of the envelope. The cylindrical wall 20 of the envelope 10 is sealed to the plates 12 and 18 by cusp shaped rings or headers 22 and 24. The lower lip 26 of the header 22 extends radially inward along the surface of the plate 14, leaving an opening at its center. The envelope 10 is evacuated and glass to metal seals are used in connecting the headers 22 and 24, and other metallic members to the glass portion of the envelope. Conventional techniques used in the fabrication of vacuum tubes may be employed for this purpose. In the event that the tube is to be used in a vacuum environment (e.g., in space) the window 12 may be dispensed with.

Supported on a sheet 28, of insulating material, as by being cemented thereto, is an array 30 of semiconductive photo diodes. These diodes, as may be observed in FIG. 2 are equally spaced from each other along rectangular ($x$–$y$) coordinates. The diode array 30 may be fabricated in accordance with conventional semiconductor techniques by growing or depositing on a substrate of non-conductive material, such as ceramic, P-N junctions of silicon semi-conductive material which is photo conductive. Thus, illumination falling on one or more of these diodes in the array 30 will produce electronic activity and conduction across the junction. Individual leads 32 are made to each diode. There may be two leads per diode. However, preferably, a single layer of conductive material may be deposited on the substrate so as to make contact with one side of each junction and individual leads 32 provided so as to make contact with the other side of each junction. The leads 32 are brought out through the envelope, the metal to glass seals being preserved so as to maintain the vacuum, and the leads connected to terminals 34. These terminals 34 may be mounted on the flange of a metal bracket 36 which is a tubular spool in shape and attached to the rear end 18 of the envelope. Conducting terminals 34 and also terminal 40 may be attached by non-conducting material 38 inserted in the flange of 36 to form feed-through terminals, such that each of the terminals 34 and also 40 terminal is insulated from the other terminals and other parts of the tube. Thus, a ring of terminals is disposed on the support, 36, near the outer rim of the flange thereof. One of the terminals 34 is connected to the common side of each of the diodes in the array 30. A terminal 40 in the ring of terminals 34 is provided for a ground connection. This terminal 40 is connected to the header 24 and to an aperture plate 42 of conductive material disposed around the forward surface of the plate 16 which forms part of the window 12. The aperture in the plate 42 permits the passage of illumination into the tube. A conductive transparent coating, not shown, may be used to cover the outer surface of window 12, connecting to ring 42, to prevent electrostatic charges from building up on the window surface.

A photo emissive element 44 in the form of a layer of photo emissive material is placed as by being deposited on a portion of the inner surface of the window 12. The photo emissive material may be cesium-antimony ($C_s$-$S_b$) or some other material which is photo emissive at the wavelength of the illumination of interest viz., the illumination which is to be detected by the photo detector system). Preferably, the layer of photo emissive material 44 is partially transparent to the illumination or at least substantially translucent thereto. Accordingly, a translucent photo emissive material such as a thin layer of cesium-antimony is desirably used, or the layer may be made especially thin so as to be penetrated by the illumination. As may best be observed in FIG. 2 the portion of the window on which the photo emissive material is disposed, is a semi-circular area offset to one side of the central axis of the envelope 10. Alternatively, if the photo cathode is made sufficiently transparent to allow the required fraction of light to reach the photo diodes, the full window may be covered and light may pass through the photo cathode to the photo diodes for operation in the bright light mode. The center of the array 30 is directly on this axis and the half of the array which is visible through the window 12 may also be observed in FIG. 2. The layer of photo emissive material 44 extends to and is in contact with the lip 26 of the lower header 22. A source of negative (with respect to ground) high voltage, say —20 Kv is applied to the header 22 by way of a high voltage cable 46. The upper portion 48 of this cable may be shielded so as to prevent induction of any stray noise to the leads 32 from the photo diodes in the array 30. The photo emissive element 44 thus acts as a photo cathode. When illuminated, this photo cathode 44 emits electrons which, because the photo cathode 44 is at a much more negative potential than the region of the envelope 10 in which the diode array 30 is located, (note that the upper header 24 is connected to ground and that the diode array is at a voltage equal to or near ground potential) are accelerated towards the array 30. In order to provide for more accurate direction of the electrons from the photo cathode 44 an electron gun structure is located within the envelope. This electron gun structure consists of the aforementioned headers 22 and 24 and several baffles or electrodes 50, 52, 54, 56, 58 and 60, which are spaced from each other and extend radially outward from the wall 20 of the envelope 10. The baffles 50 and 60 are coaxial with the axis of the envelope and are brought out of the walls of the envelope through vacuum type seals. Resistors 62 are connected between the lower header 22 and the baffle 50, between successive ones of the baffles 50 and 60, and between the baffle 60, and the upper header 24. These resistors 62 provide a resistor voltage divider through which proper potentials derived from the source which is connected to the cable 46 to establish a uniform accelerating field for the electrons from the photo cathode.

The envelope 10, the periphery of the window 12, the rims of the baffles 50 to 60, the resistors 62, the lower portion of the cable 46, and in total all of the portions of the tube which are of high voltage, are encased in a body of insulating material 64. This body of insulating material 64 may be applied by locating the envelope and the aforementioned parts thereof, in a mold, and filling the mold with encapsulating material such as epoxy resin, which is allowed to harden so as to form the body 64. A metal tube 66 encompasses the body 64. This tube 66 may be in two parts, namely an open ended flanged cap 68 which is secured in a spring fitting 70 which encompasses the upper portion of the body 64.

Figure 3:
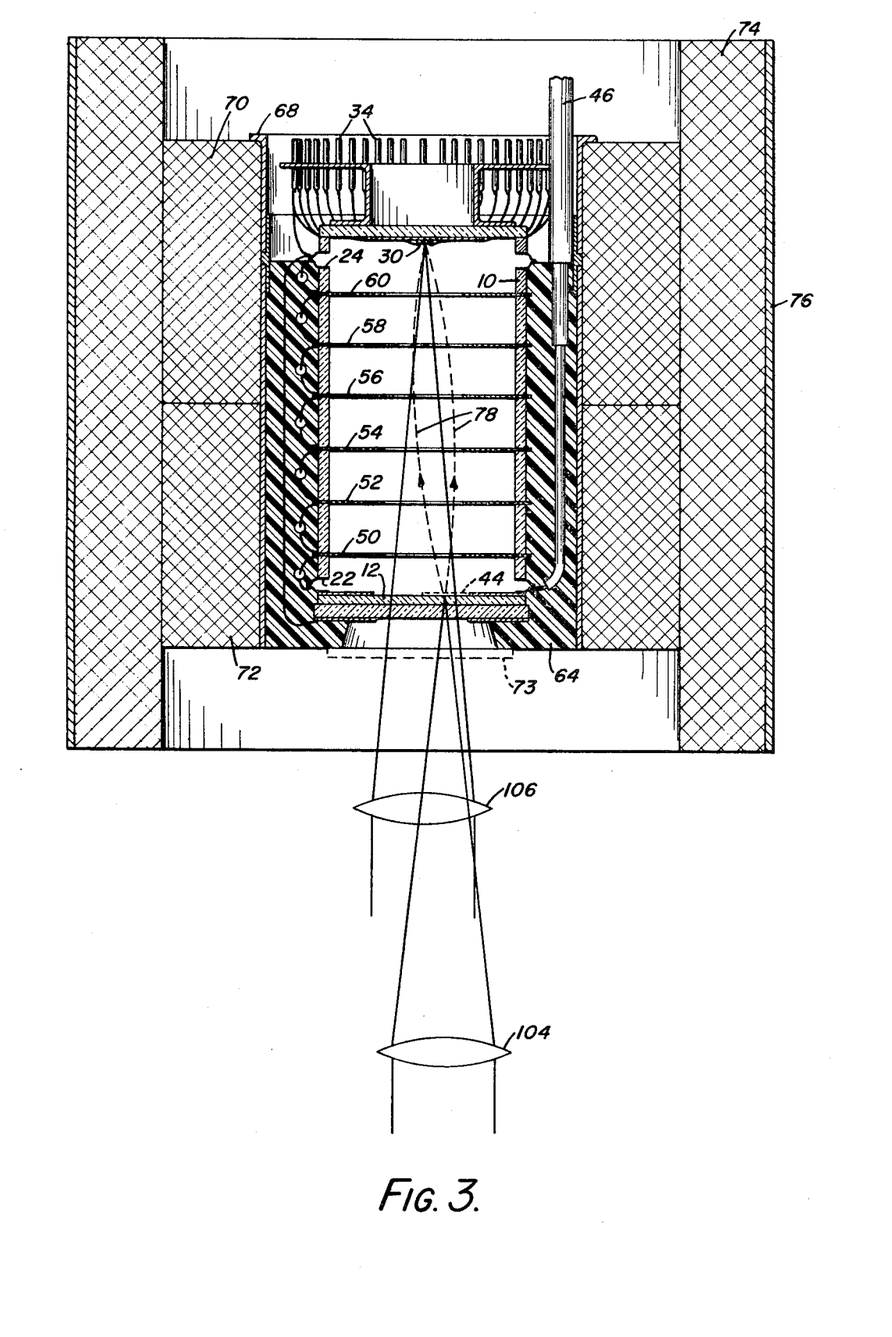
FIG. 3 is a cross-sectional view of a photo detector system embodying the tube shown in FIGS. 1 and 2, together with optics focusing the image to be detected.

As shown in FIG. 3 the detector tube is surrounded by a pair of deflection coils 70 and 72 and by a focusing coil 74. The coil assembly is surrounded by a tube 76 of magnetic material, such as soft iron which acts as a magnetic return path and a shield. The casing tubes 66 and 68 are of non-magnetic material, such as copper. The focusing coil 74 serves to focus the electron image produced by the operation of the photo cathode 44 on the surface of the diode matrix, and particularly on an individual diode of that matrix. In other words the electrons emitted by each small area on the photo cathode are formed into a beam which is focussed to impinge on a corresponding small area at the upper end of the tube. Thus there is a small area on the photo cathode which corresponds to each diode in the diode matrix when a particular combination of voltages and magnetic field is applied to the tube.

The deflection coils 70 and 72 deflect the electron beams across the diode matrix and thus can change the area on the photo cathode that transmits electrons to each particular diode. This allows the selection of the area on the photo cathode that is to be focussed on the diodes and is particularly important when only a portion of the window is coated with photo cathode material. Furthermore, various portions of the photo cathode can be made to have different properties. For example, parts of the photo cathode can be made sensitive to various frequencies of radiation by varying the material of which the photo cathode is made or by placing color filters 13 over selected portions of the photo cathode. By proper adjustment of magnetic fields and voltage on the tube it is also possible to change the size of the photo cathode area that emits the electrons that are focussed on the diode array and thus change the size (or magnification) of the image being detected.

Figure 5:
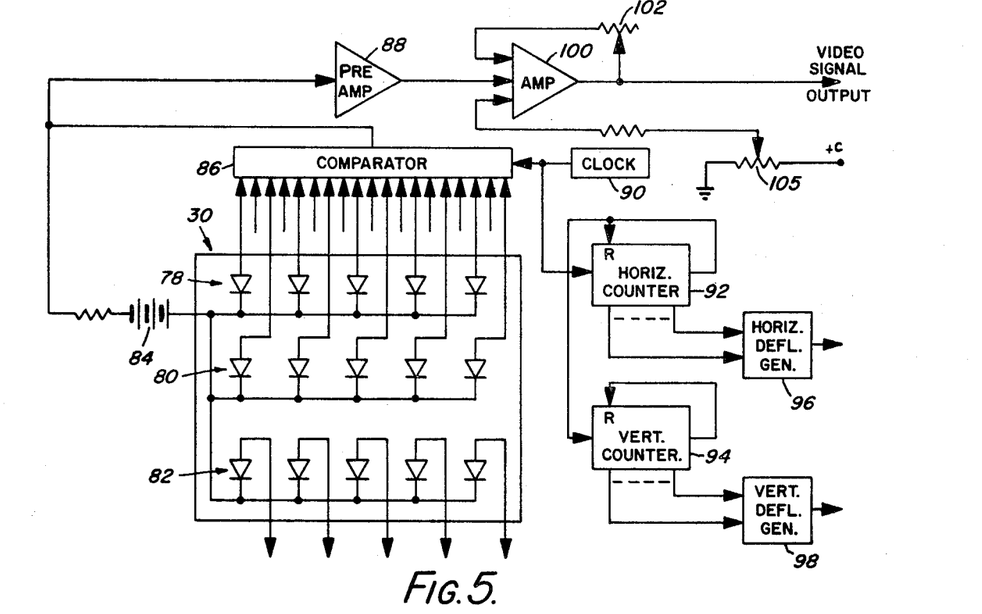
FIG. 5 is a schematic diagram of the photo detector diode array contained in the tube shown in FIGS. 1 and 2, together with associated electronic circuitry.

As shown in FIG. 5 the photo detector diode array contains several rows of individual diodes 78, three of which, 78, 80 and 82 are illustrated by way of example. All of the diodes are back biased by means of a battery 84 and the anodes of the diodes are connected through a comparator 86 to the input of a preamplifier 88. The comparator may be a commutator circuit which is operated by clock pulses from a clock pulse source 90 so as to successively enable the connection of each diode on a row by row basis to the input of the preamplifier 88. In other words, the anodes of the diodes in the first row 78 will be connected one after the other through the comparator to the input of the preamplifier. Then the diodes in the next row 80 will be connected one after the other. Successive rows of diodes will similarly be connected, until finally the diodes in the last row 82 are successively connected to the preamplifier.

The image detected on the diode array may be displayed using conventional cathode ray tube display techniques utilized in television or by means of electronic printer such as used for transmission of pictures by radio or wire or by an array of light producing elements such as filament lamps or light emitting diodes or by other means. The cathode ray tube display has been chosen as an example.

In order to synchronize the scanning of the beam in a cathode ray tube display device with the diode which is then being gated by the comparator, horizontal and vertical deflection signals are generated by a horizontal counter 92 and a vertical counter 94. The horizontal counter has a capacity to count up to a number corresponding to the number of diodes in each row of the array 30. When this number is reached, the counter 92 resets itself and applies a pulse to the vertical counter 94. The vertical counter counts a number corresponding to the number of diodes in each column of diodes in the array. When the count equal to this number is reached, the vertical counter then resets itself. A horizontal deflection generator 96 and a vertical deflection generator 98 are connected to each of the stages of the counter and are operative to decode the count stored therein into an analog deflection signal which is applied, in the case of the horizontal deflection generator 96 to the horizontal deflection coil of a cathode ray tube display device and in the case of the vertical deflection generator 98 to the vertical deflection coil of the display device. The video signal is applied to the control grid of the cathode ray tube display device. Accordingly, the gating of the diodes in the array 30 will be synchronized with the deflection of the electron beam in the display cathode ray tube.

Figure 6:
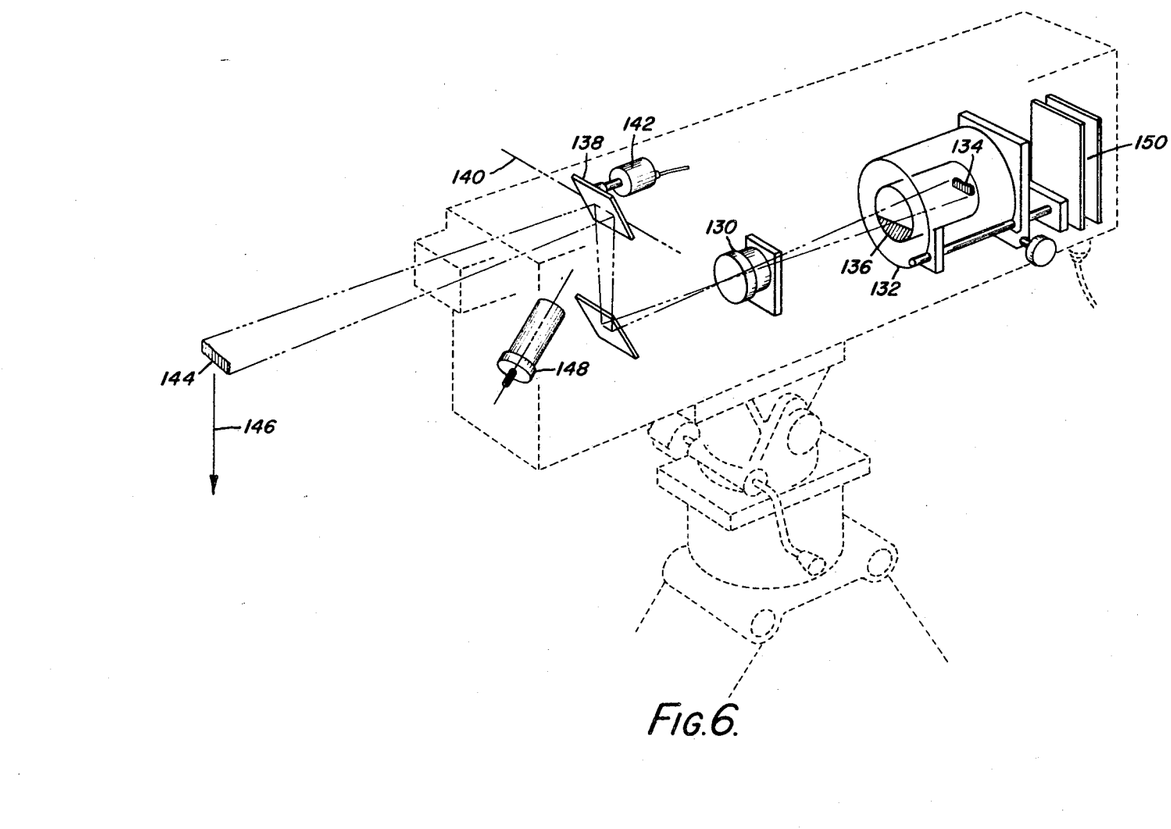
FIG. 6 is a simplified, diagramatic, perspective view of a photo-detector system utilizing a line array of diode detectors to scan electronically in one dimension and a mirror to optically scan in a second dimension.

It is also possible to scan in one direction optically and in the other direction electronically. Referring to FIG. 6 a lens 130 is used to project a scene onto the photosensitive surfaces of a detector tube 132 which is similar to the tube shown in FIGS. 1 – 3. Tube 132, instead of a matrix array, incorporates a single row or line array of photo diodes 134 and a photo cathode 136. For simplicity, the lens 130 is shown focussed on photodiode line array 134 only, but it can also be focussed on the photocathode 136. Optical scan is accomplished by rotating a mirror 138 on axis 140 by means of actuator 142 (e.g., a solenoid or servo motor). This causes the projection 144 of line array 134 to move across the scene being scanned in the vertical direction as indicated by arrow 146. Scanning in the horizontal direction is accomplished by sequentially commutating the diodes of line array 134 similarly to the scan of one line of the two-dimensional array 30 of FIG. 5. Frame synchronization is provided by the scan start detector 148 which contains a light source, photo cell and suitable optical system. When mirror 138 moves past a predetermined angular position, it reflects light from the light source back into the photocell and generates the frame start signal. Electronics 150 similar to those in FIG. 5 are used to synchronize the horizontal line scan and to provide the video output signal.

Optical scanning in both directions (horizontal and vertical) can be used in accordance with the invention. In that event, only a single diode or a continuous photo detective surface may be used in lieu of the array 30. The optical system may include mirrors for scanning the object to be detected, such that a small aperture is effectively scanned across the photo-sensitive area. Synchronizing signals from the optical scanning system such as, for example, pulses obtained at the end of each horizontal scan and at the end of each frame may be provided and, combined with the signal from the photo detector, used to reconstruct the image of the object being scanned, either directly or after being recorded, as on magnetic tape, through the use of television or other video recording techniques.

Returning to FIG. 5 the signal from the preamplifier is applied to an operational amplifier 100. A gain at the amplifier may be adjusted by means of a potentiometer 102 and the threshold (viz., the lowest signal level) of the amplifier may be adjusted by means of a potentiometer 104, which contains a threshold adjust voltage from a source indicated at +c. The output from the amplifier is a video signal which may be used to reconstruct the image detected by the photo detector system. Synchronizing signals obtained from the horizontal and vertical counters 92 and 94 may be combined with this video signal when the image is to be reconstructed through the use of television techniques (viz., on a cathode ray tube). FIG. 3 also illustrates the operation of the apparatus under normal, bright conditions of illumination and under dim, low level illumination conditions. For low level, dim conditions, a lens system illustrated by a condenser lens 104 focuses the image to be detected on the photo cathode 44. The negative potential is then applied by way of the cable 46 and the electron gun, made up of the headers 22 and 24 and the baffles 50 to 60 operate as an electron optical system to direct the electrons emitted by the photo cathode so that they impinge upon the surface of the array 30. It is believed, and it should be understood that the invention is not predicated upon any theory of operation, that the high velocity electrons produce electron conduction within the semi-conductor, as for example, by reducing the work function of the junction. The current then flows and develops a sufficient potential to overcome the back bias as may be produced by the battery 84 (see FIG. 5). The signal is proportional to the intensity of electron bombardment (viz., the electron current in the beam of electrons focussed on the photo detector diode). Inasmuch as the photo emission from the photo cathode is proportional to the intensity of light, the electron induced current is proportional to the illumination. The phenomenon referred to above has been called electron bombardment conduction.

During normal, bright light conditions, an optical image is focussed by readjusting the lens 104 or through the use of another lens 106 to focus the image directly on the photo detector array 30. The image may be focussed on a single diode or upon the entire array which then may be commutated as described above, in connection with FIG. 5, to provide a video signal output corresponding to the image which is to be detected. Inasmuch as the signal output from the photo detector array is enhanced by virtue of the electron bombardment conduction during the dim light mode, the output signals both for bright light and dim light modes, may be substantially the same in magnitude, thus affording dual mode detection capability within the photo detector apparatus itself and without the need for external modifications or separate low or dim illumination level devices.

Figure 4A:
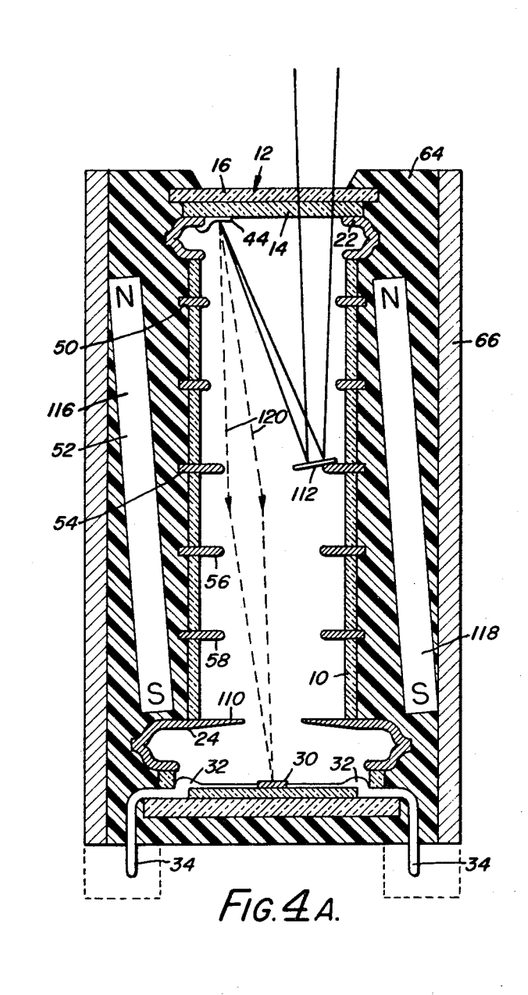
FIGS. 4a and 4b are simplified cross-sectional views of a detector tube in accordance with another embodiment of the invention. In operation in the augmented (e.g. dim light) and unaugmented (e.g. bright light) modes respectively.
Figure 4B:
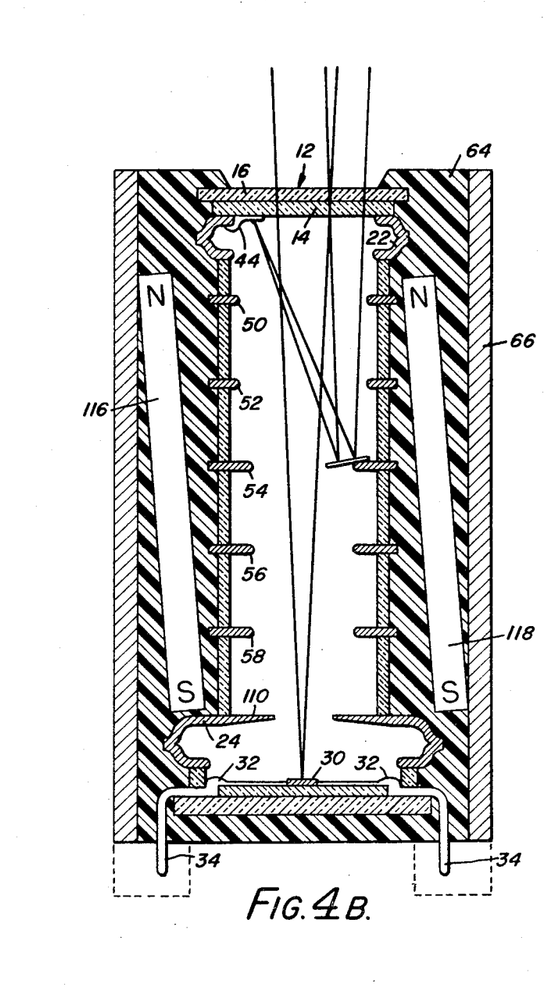

Referring to FIGS. 4A and 4B, there is shown a photo detector apparatus embodying the invention which is operative without refocussing of the optical image from the photo detector array 30 on to the photo cathode 44 when changing from the bright illumination to the dim illumination mode of operation. The tubes shown in FIG. 4 and FIGS. 1 and 2 are similar and like parts have been identified with like referenced numerals. The illustration has been simplified in that the cable 46 and the connections to the headers 22 and 24 and to the baffle electrodes 50, 52, 54, 56 and 58, are not shown. It will be noted that the header 24 has an inward, tapered extension 110 thereby eliminating one of the baffle electrodes and simplifying the electron gun structure.

It would also be pointed out that the tube structure cross-section need not be circular but may be elongated in one dimension if desired, to accommodate a long array. The view shown in FIG. 4A and 4B could apply to the narrow dimension of the tube and the tube could be extended as desired in the dimension perpendicular to the plane drawn.

In order to illuminate the photo cathode without refocussing, the same lens (not shown) is adapted to illuminate a mirror 112. The photo cathode 44 is laterally offset from the mirror 112 on opposite sides of the axis of the tube. Also the mirror 112 is disposed between the photo detector array 30 and the photo cathode 44 such that the optical path from the lens to a focus, either at the photo detector array, or at the photo cathode 44 is the same. The mirror may be attached as shown to one of the baffles 54 or otherwise to the wall of the envelope 10. This arrangement has the further advantage that the photocathode need not be transparent.

The augmented or dim light mode of operation is obtained by applying the accelerating voltages to the headers and baffle electrodes, as was discussed above in connection with FIGS. 1 through 3. The illumination imaged at the photo detector 44 results in the emission of electrons. Instead of a focussing coil, a pair of bar magnets 116 and 118 are provided. This pair of bar magnets extend longitudinally along the axis of the tube and are tilted so as to deflect the electron beam, as well as to focus it, as shown by the dash line 120.

FIG. 4B illustrates operation in the bright or normal illumination mode. Although light will be reflected from the mirror 112 to the photo cathode, any electrons which are emitted from the photo cathode will not reach the photo detectors in sufficient number to effect conduction in the photo detector diodes, since the high voltage is turned off in this operation mode. The illumination reaching the photo cathode 44 may be partially reflected therefrom and from the window, 12. However, such reflected illumination will be scattered by the baffles 50 to 58 and by the 110 so as not to interfere with the detection of the direct illumination by the array 30.

From the foregoing description it will be apparent that there has been provided improved photo detector apparatus capable of dual modes of operation, utilizing essentially the same components for both modes of operation. The detection of images and objects and other photo detection purposes, both for dim illumination and bright illumination, are thereby provided within the apparatus itself and particularly with the same photo detector tube. While two embodiments of the photo detector tube have been described herein, it will be appreciated that variations and modifications will be apparent to those skilled in the art.

What is claimed is:

1. Apparatus for detecting radiant energy from a source of radiant energy which comprises:
   a. a photo electric element for providing an electric signal when irradiated by radiant energy from said source and by electrons,
   b. a photoemissive element for emitting electrons when irradiated by radiant energy from said source, and
   c. means for irradiating said photoelectric element with electrons emitted by said photoemissive element.

2. Apparatus for intensifying images which comprises:
   a. a photoelectric element,
   b. means for imaging radiant energy from said image upon said photoelectric element,
   c. a photoemissive element,
   d. means for also imaging radiant energy from said image upon said photoemissive element, and
   e. electron optical means for imaging the electrons emitted by said photoemissive element upon said photoelectric element whereby to intensify said image at said photoelectric element.

3. The invention as set forth in claim 2, wherein said means for imaging said radiant energy images upon said elements includes optical means for focussing said images upon either said photoelectric element or said photoemissive element.

4. The invention as set forth in claim 3 wherein said photoelectric element and said photoemissive element are spaced from each other along the path of said radiant energy.

5. The invention as set forth in claim 4, wherein said photoelectric element and said photoemissive element are also laterally offset from each other, said photoemissive element being disposed ahead of said photoelectric element in the direction of propagation of such energy.

6. Photoelectric detector apparatus which comprises:
   a. a photoelectric transducer,
   b. said transducer being disposed directly to receive illumination to be detected,
   c. a photoemissive element in spaced relationship with said photoelectric transducer,
   d. said element also being disposed directly to receive illumination to be detected, and e. electron optical means operative to direct electrons resulting from said illumination to said transducer for augmenting the effect of said illumination at said transducer.

7. The invention as set forth in claim 6 including means for rendering said electron optical means operative whereby to operate said apparatus selectively in augmented and normal modes.

8. The invention as set forth in claim 6 wherein said electron optical means includes means for accelerating the electrons emitted by said photoemissive element so that said electrons bombard said transducer to induce conduction therein.

9. The invention as set forth in claim 8, wherein said electron optical means further includes means for converging said electrons into a beam focused at said transducer.

10. The invention as set forth in claim 9 wherein said electron optical means further includes means for deflecting said beam across said transducer.

11. The invention as set forth in claim 9 wherein said transducer is a semiconductive photodiode.

12. The invention as set forth in claim 10 wherein said transducer comprises a substrate disposed in the path of said beam and an array of semiconductive photodiodes disposed in side by side relationship on said substrate.

13. The invention as set forth in claim 6 wherein said photoemissive element is a photocathode, and said electron optical means, includes means for applying voltage to said photocathode to make said photocathode more negative than said transducer.

14. The invention as set forth in claim 13, wherein said electron optical means includes a plurality of electrodes disposed in spaced relationship between said photocathode and said transducer, and means for applying negative voltages of successively higher magnitude to said electrodes with the highest of said voltages being applied to the one of said electrodes closest to said photocathode.

15. The invention as set forth in claim 14 wherein said transducer has a surface, and wherein said electron optical means includes a coil disposed around said electrodes for converging said electrons from said photocathode into a beam focused at said transducer surface.

16. The invention as set forth in claim 14 wherein said electron optical means includes a pair or array of permanent magnets, spaced laterally from each other, said transducer and said photocathode being disposed adjacent opposite ends of the region between said magnets, said magnets defining a focussing field for electrons emitted by said photocathode.

17. The invention as set forth in claim 16, wherein said photocathode is disposed along an axis extending longitudinally through said region, said photocathode being offset from said axis.

18. The invention as set forth in claim 17 including a mirror disposed between said photocathode and said transducer and offset from said axis, said mirror reflecting said illumination to said photocathode.

19. The invention as set forth in claim 18 wherein said transducer has photoconductive material having a surface, and wherein said electron optical means includes means for scanning said focussed electrons over said surface.

20. The invention as set forth in claim 6 further comprising an envelope having a window for the passage of said illumination at one end thereof, said transducer being disposed at the end of said envelope opposite from said window, said photoemissive element being a photocathode disposed on the inner surface of said window, said electron optical means comprising an electron gun within said envelope.

21. The invention as set forth in claim 20 wherein said photocathode is a layer of photoemissive material.

22. The invention as set forth in claim 21, wherein said layer is partially transparent to said illumination.

23. The invention as set forth in claim 21, wherein said transducer is located on the axis of said envelope and said photocathode is disposed upon a portion of said window which is laterally offset from said axis.

24. The invention as set forth in claim 21, including first lens means for focussing said illumination at said transducer, and second lens means for focussing said illumination at said photocathode.

25. The invention as set forth in claim 20, further comprising deflection coil means encompassing said envelope, and focussing coil means also encompassing said envelope.

26. The invention as set forth in claim 25, wherein said transducer is an array of semiconductive photodiodes, and leads to each of the diodes in said array extending from said diodes through said envelope at said one end thereof.

27. The invention as set forth in claim 20 wherein said electron gun comprises a plurality of conductive electrodes disposed within said envelope, said electrodes being coaxial with the axis of said envelopes, one of said electrodes being disposed upon said window and in contact with said photocathode, said electrodes being spaced from each other in a direction longitudinally along said axis, means for applying a first negative potential to said one electrode and negative potentials of successively lower magnitude than the magnitude of said one potential to the other ones of the other of said electrodes which are spaced successively closer to said transducer.

28. The invention as set forth in claim 27 including a cylinder of encapsulating material surrounding said envelope.

29. The invention as set forth in claim 28 including bar magnets encapsulated in said material and diametrically disposed in the direction of the axis of said envelope and diametrically opposite each other on opposite sides of said axis.

30. The invention as set forth in claim 29 wherein said photocathode is disposed to one side of said envelope, a mirror disposed within said envelope and spaced away from said window toward said transducer and to the opposite side of said envelope for reflecting illumination to said photocathode, said bar magnets being tilted with respect to the axis of said envelope for establishing a magnetic focussing field for focussing electrons emitted from said photocathode at said transducer.

31. The invention as set forth in claim 20 including a means for focussing electrons emitted from different portions of said photocathode upon said transducer.

32. The invention as set forth in claim 31 wherein said focussing means comprises deflection and focussing coil means surrounding said envelope.

33. The invention as set forth in claim 31 including means for providing said portions with different spectral characteristics.

34. The invention as set forth in claim 33 wherein said spectral characteristic providing means comprises filters interposed in the path of illumination to said photocathode.

* * * * *